Patented July 15, 1952

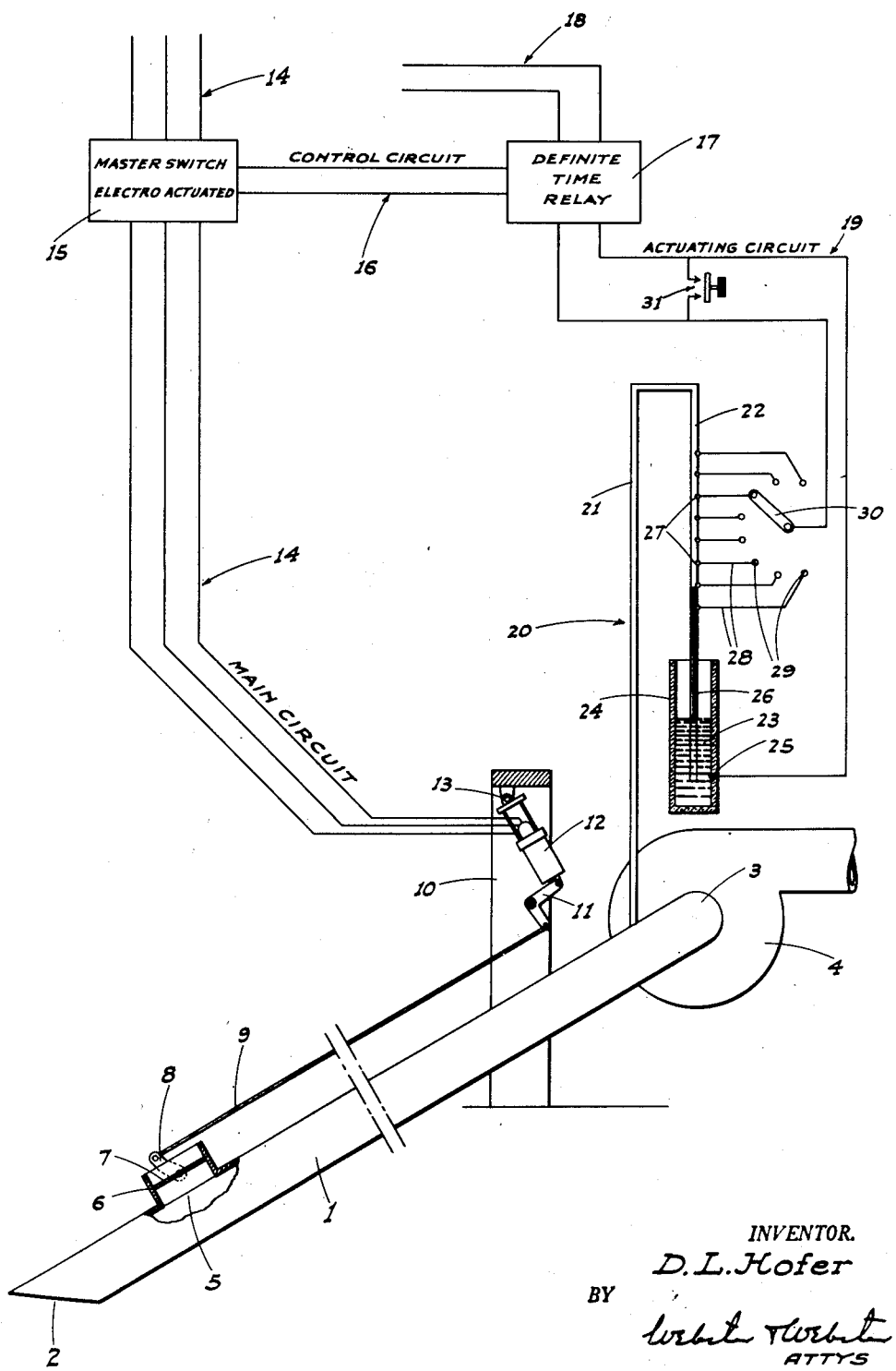

2,603,234

UNITED STATES PATENT OFFICE 2,603,234

RELIEF VALVE OPERATING AND CONTROL MECHANISM

David L. Hofer, Berkeley, Calif.

Application November 3, 1947, Serial No. 783,738

2 Claims. (Cl. 137—488)

This invention is directed to, and it is an object to provide, a novel operating and control mechanism for an emergency relief valve on the suction pipe of a dredge; such valve being adapted to relieve excess vacuum in the pipe when the latter becomes plugged at the intake end while in use.

Another object of the invention is to provide a relief valve operating and control mechanism which is a modification and simplification of the invention of U. S. Patent No. 2,250,021, dated July 22, 1941.

A further object of the invention is to provide a mechanism, for the purpose described, which includes an electrically energized power unit coupled in operative relation to the relief valve; the latter being of butterfly type in an open lateral neck on the suction pipe.

An additional object is to employ a novel circuit for the electric power unit; such circuit including a variable contact, mercury type manometer which is responsive to vacuum in the suction pipe, and such manometer is arranged to serve as the means to initiate operation of the electric circuit.

It is also an object of the invention to provide a circuit, as above, which includes a definite time relay interposed between the manometer and master switch whereby to prevent teetering of the electrically energized power unit and the connected relief valve.

Another object of the invention is to provide a relief valve to open automatically when there is excessive vacuum in the suction pipe due to too much material at the intake, so as to maintain a constant velocity in the discharge pipe from the pump.

A further object of the invention is to provide a reliable relief valve operating and control mechanism, and one which will be exceedingly effective for the purpose for which it is designed.

These objects are accomplished by means of such structure and relative arrangement of parts as will fully appear by a perusal of the following specification and claims.

The figure of the drawing is a diagrammatic illustration of the invention.

Referring now more particularly to the characters of reference on the drawings, the numeral 1 indicates the vacuum or suction pipe of a suction type dredge; the lower or intake end of said pipe 1 being indicated at 2, and said pipe is connected, at its upper end, as at 3, to the intake of the dredge pump 4.

As the dredge pump 4 is very powerful, it is essential that emergency relief means be provided against damage to the suction pipe 1 which would otherwise occur upon plugging of the intake end 2 of said pipe.

In the present embodiment, the emergency relief means comprises a relief port 5 in the top of the suction pipe 1 adjacent, but short of, its lower end 2. An open, laterally projecting neck 6 is secured to the pipe 1 in communication with the relief port 5, and a butterfly valve 7 is turnably mounted in the neck 6.

In the event of a plug at the intake end 2 of the pipe 1, opening of the butterfly valve 7 will permit a surge of water into the lower end portion of the pipe 1, which relieves excess vacuum created in such pipe by occurrence of the plug, and also tends to cause elimination of said plug.

The present invention deals with the operating and control mechanism for the relief valve 7; such mechanism comprising the following:

The relief valve 7 includes a radial lever 8, by means of which said valve may be shifted between closed and open positions. A control rod 9 is pivotally connected to the lever 8 and thence extends lengthwise, in an upward direction, alongside the suction pipe 2.

On the dredge there is a rigid frame 10 mounted adjacent the upper end of the control rod 9, and said frame carries a pivotally mounted bellcrank lever 11, one end of said lever being pivotally connected to the upper end of said rod 9.

An electrically energized power unit 12 is connected between the other end of the bellcrank lever 11 and a pivot bracket 13 on the rigid frame 10. This electrically energized power unit 12 is of a type which includes an electric motor and translation mechanism operative to convert rotation of such motor to lineal motion; i. e. lineal extension and contraction of the device. It will therefore be evident that with extension and contraction of the power unit 12, the valve 7 will be opened and closed, respectively.

As the electrically energized power unit 12 is mounted above water on the dredge, there is an elimination of all under water working parts except the control rod 9 and valve 7.

A main feed circuit 14 leads to the electrically energized power unit 12, and an electro-actuated master switch 15 is interposed in said main circuit 14.

The electro-actuated master switch 15 is operated by a control circuit 16 which leads between a definite time relay 17 and said master switch 15; there being a feed circuit 18 leading to said relay.

An actuating circuit 19 extends from the definite time relay 17 to a variable contact, mercury-type manometer, indicated generally at 20.

The manometer 20 comprises a manometer tube 21 connected to the suction pipe 1 adjacent the dredge pump 4, and such tube 21 includes a vertical leg 22 depending into a quantity of mercury 23 in a receptacle 24.

The quantity of mercury 23 in the receptacle 24 is in electrical contact with one wire of the actuating circuit 19, by means of a contact 25. With the imposition of increasing vacuum on the manometer tube 21, including the vertical leg 22, a column of mercury 26 rises in said leg 1, successively making electrical connection with a plurality of contacts 27 fitted in said tube in vertically spaced, dielectric relation to each other. In other words, as the vacuum in the pipe 1 increases, there is a successive closing of the mercury column 26 with the contacts 27 in a direction from bottom to top of the vertical row of said contacts. Leads 28 run from the contacts 27 to contacts 29 adapted for selective engagement, one at a time, by a switch blade 30. The switch blade 30 is connected to the other lead of the actuating circuit 19.

The contacts 27 are positioned on the leg 22 of the manometer tube at points representing predetermined and differential excess vacuums in the suction pipe 1, and thus the switch blade 30 may be set on any selected contact 29 representing a known excess vacuum in the pipe 1.

The butterfly valve 7 is normally closed, but upon plugging of the intake end 2 of the suction pipe 1, the vacuum in such pipe becomes excessive. When this occurs, the mercury column 26 rises in the leg 22 until it makes electrical connection with the contact 27 corresponding to the set position of the blade 30. This results in closing of the actuating circuit 19, energizing the definite time relay 17, which in turn closes the normally open master switch 15 through the medium of the control circuit 16. Upon closing of the master switch 15, the electrically energized power unit 12 operates to open the butterfly valve 7 to relieve the excess vacuum in the pipe 1, as previously explained. Upon relief of such vacuum, usually with attendant breaking of the plug at the intake end 2, the mercury column 26 falls away from the contact 27 corresponding to the closed position of the switch blade 30. This opens the actuating circuit and all of the parts return to normal, except that the definite time relay does not cause opening of the master switch 15 until a predetermined time lapse, usually a matter of seconds. The use of this relay is important, as it prevents teetering of the master switch 15, power unit 12, and butterfly valve 7, which would otherwise occur with fluctuations of the mercury column 26 close to the contact 27 corresponding to the closed position of the switch blade 30.

As an emergency device, there is a normally open hand or foot switch 31 connected across the actuating circuit 19 and disposed in an accessible position to the dredge operator. This emergency switch 31 is intended to be used to effect opening of the butterfly valve 7 under such working conditions as might not be within the range of the manometer 20.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. In the assembly of a normally closed relief valve in the suction pipe of a dredge, and an electrically energized power unit to operate the valve; control means for actuating the unit comprising an energizing circuit for the unit having a normally open electro-actuated master switch therein, a definite time relay, a suction-actuated contacting manometer, an actuating circuit between the manometer and relay, and a control circuit between the relay and the master switch.

2. Control means as in claim 1, including a normally open manual switch connected across the actuating circuit to allow of closing of said circuit irrespective of manometer operation.

DAVID L. HOFER.

REFERENCES CITED

The following references are of record in the file of this patent:

UNITED STATES PATENTS

| Number | Name | Date |
|---|---|---|
| 913,180 | Wyman | Feb. 23, 1909 |
| 1,931,791 | Dueringer | Oct. 24, 1933 |
| 2,177,354 | Marcus | Oct. 24, 1939 |
| 2,243,446 | Terlesky et al. | May 27, 1941 |
| 2,250,021 | Hofer | July 22, 1941 |
| 2,393,201 | Stafford | Jan. 15, 1946 |